(No Model.)

H. W. BUCKLAND.
DRILL AND ECCENTRIC CHUCK.

No. 488,382. Patented Dec. 20, 1892.

WITNESSES
H. A. Lantz
Pearl M. Reynolds

INVENTOR
Harry W. Buckland
By A. M. Wooster
Atty.

THE NORRIS PETERS CO., PHOTO-LITHO., WASHINGTON, D. C.

UNITED STATES PATENT OFFICE.

HARRY W. BUCKLAND, OF WATERBURY, CONNECTICUT, ASSIGNOR OF ONE-HALF TO ANDREW BAIRD, OF SAME PLACE.

DRILL AND ECCENTRIC CHUCK.

SPECIFICATION forming part of Letters Patent No. 488,382, dated December 20, 1892.

Application filed July 16, 1892. Serial No. 440,230. (No model.)

*To all whom it may concern:*

Be it known that I, HARRY W. BUCKLAND, a citizen of the United States, residing at Waterbury, in the county of New Haven and State of Connecticut, have invented certain new and useful Improvements in a Combined Drill and Eccentric Chuck; and I do hereby declare the following to be a full, clear, and exact description of the invention, such as will enable others skilled in the art to which it appertains to make and use the same.

Figure 1:
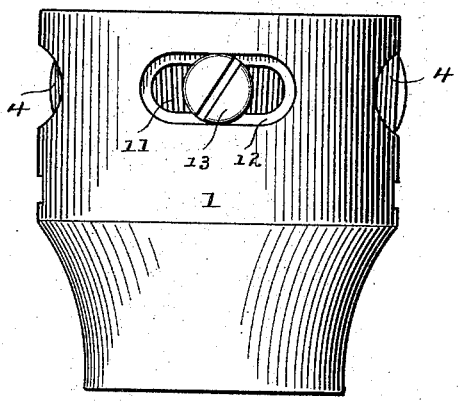
Figure 2:
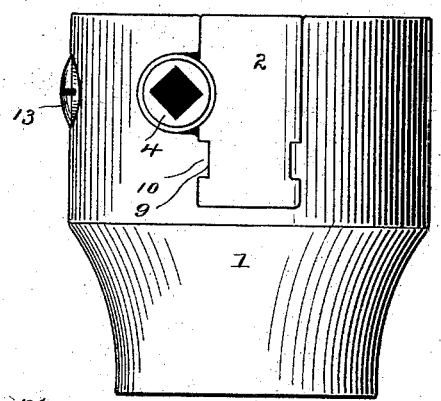
Figure 3:
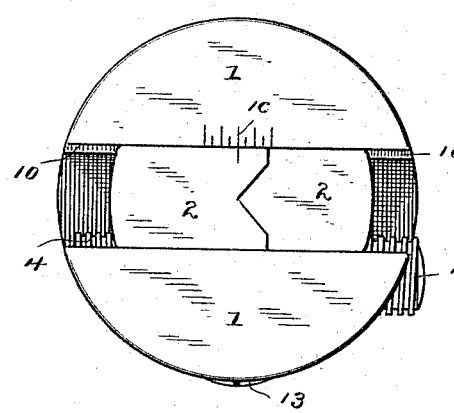
Figures 4, 7:
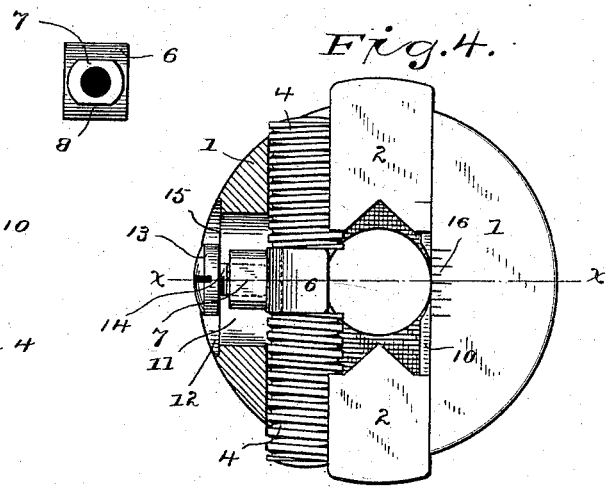
Figure 6:
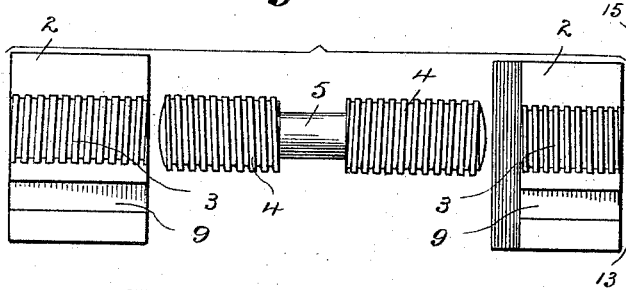
Figure 5:
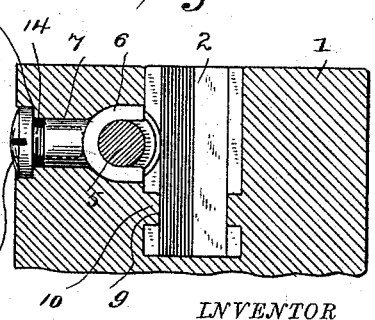

My invention has for its object to so improve the construction of drill chucks as to combine therewith the features of an eccentric chuck, and also to insure that the parts may readily be kept tight in use. With these ends in view I have devised the simple and novel construction which I will now describe referring by numbers to the accompanying drawings forming part of this specification in which:

Figure 1 is an elevation of my novel chuck. Fig. 2 a similar view, the point of view being at right angles to that in Fig. 1. Fig. 3 a plan view the jaws being in the closed position. Fig. 4 a plan view the jaws being in the open position, and the half of the body which contains the operating screw being in horizontal section, so as to show the screw and the manner in which it is engaged by the yoke. Fig. 5 a section on the line $x\,x$ in Fig. 4 the yoke being in end elevation. Fig. 6 an elevation of the jaws and operating screw detached, and Fig. 7 is a plan view of the yoke detached.

1 denotes the body of the chuck, 2 the jaws having the usual screw seats 3, and 4 a right and left threaded operating screw having a reduced unthreaded central portion as at 5. The reduced portion of the operating screw is engaged by a movable yoke 6 which is provided with a shank 7 two of the sides of which are ordinarily flattened as at 8 and which is provided with an internal screw thread. The jaws are provided with grooves 9 which are engaged by ribs 10 upon the body upon which they slide freely. The shank of the yoke lies in a slot 11 on one side of the body, the flattened sides of the shank engaging the sides of the slot so as to prevent the yoke from turning in the slightest. The outer end of the slot is enlarged as at 12 to receive the head 13 of a screw 14 which engages the screw thread in the shank, the base of the enlarged portion of said slot forming a seat or shoulder 15 which is engaged by the under side of head 13 to lock the yoke, operating screw and jaws in position after they have been adjusted, leaving the jaws free to be moved in or out by rotation of the operating screw.

To adjust the jaws for ordinary work, that is for use as a drill chuck or for any work requiring the article to be centered, screw 14 is loosened and the jaws are run together as in Fig. 3, after which they may be readily adjusted to a central position. It will be noticed that I have placed a scale upon the face of the body as at 16 and have placed a single mark adapted to register therewith upon one of the jaws. To get a central adjustment it is simply necessary to cause the mark upon one of the jaws to register with the central mark of the scale as clearly shown in Fig. 3. The jaws are then locked in position by tightening up screw 14, and may be moved in or out by rotation of the operating screw but are never thrown off center. The operating screw is turned in the usual manner by a key or wrench. There is no back lash or lost motion between the operating screw and the jaws for the reason that the operating screw is held in close engagement with the screw seats by the yoke. Suppose now that it is desired to use the chuck as an eccentric chuck, for example suppose that it is required to turn an eccentric upon the same rod or piece which has been operated upon centrally, the operating screw does not require to be touched, it is simply necessary to loosen screw 14 and move the yoke, jaws, operating screw and the piece being operated upon bodily in either direction from the center mark the necessary distance to produce the required throw of the eccentric. It will of course be apparent that after the jaws have once been centered properly they can be adjusted for eccentric work without regard to whether they are open or closed, or whether a rod is held between them or not. If the eccentric is required to have a throw of a quarter of an inch the yoke operating screw and jaws require to be moved sufficient distance in either direction to place the mark upon one of the jaws an eighth of an inch from the central mark of the scale. Having given the movable yoke and parts carried thereby the required adjustment they are locked in place again by tightening up screw 14.

Having thus described my invention I claim:

1. The body having a slot in one side, and sliding jaws having screw seats, in combination with a right and left threaded operating screw engaging the screw seats, and having an unthreaded portion, a movable yoke engaging said unthreaded portion and having a shank lying in the slot, so that the yoke, operating screw and jaws may be moved together without rotation of the operating screw, and suitable means whereby the yoke operating screw and jaws may be locked in either a central or eccentric position leaving the jaws free to be moved in or out by rotation of the operating screw.

2. The body having a slot 11 and a seat 15 at the outer end thereof, and sliding jaws having screw seats, in combination with a right and left threaded operating screw engaging the screw seats and having an unthreaded portion a yoke engaging said unthreaded portion and having a shank lying in the slot, and a screw 14 engaging the shank and having a head adapted to engage the seat so that when said screw is loosened the yoke, operating screw and jaws may be adjusted either centrally or eccentrically without rotation of the operating screw, and may be held in position after adjustment by tightening up screw 14.

3. The body having a slot in one side and sliding jaws having screw seats, in combination with a right and left threaded operating screw engaging the screw seats and having an unthreaded portion, a yoke engaging said unthreaded portion and having a shank flattened to correspond with the shape of the slot for the purpose set forth, and a screw 14 engaging the shank to lock the yoke, operating screw and jaws in position after adjustment.

In testimony whereof I affix my signature in presence of two witnesses.

HARRY W. BUCKLAND.

Witnesses:
CHAS. E. HARTMAN,
HURLBURT S. SCOVILLE.